United States Patent
Duran

(10) Patent No.: US 7,942,614 B2
(45) Date of Patent: May 17, 2011

(54) METHOD AND APPARATUS FOR SELF-ALIGNING SWIVEL FOOT POWER FEED DRILL

(75) Inventor: John J. Duran, Lake St Louis, MO (US)

(73) Assignee: The Boeing Company, Chicago, IL (US)

( * ) Notice: Subject to any disclaimer, the term of this patent is extended or adjusted under 35 U.S.C. 154(b) by 535 days.

(21) Appl. No.: 12/101,081

(22) Filed: Apr. 10, 2008

(65) Prior Publication Data

US 2009/0255698 A1    Oct. 15, 2009

(51) Int. Cl.
*B23B 35/00*    (2006.01)
*B23B 45/14*    (2006.01)

(52) U.S. Cl. .............. 408/1 R; 408/79; 408/97; 408/88; 408/115 R

(58) Field of Classification Search ............. 408/1 R, 408/72 R, 79, 87, 88, 95, 97–98, 115 R, 76
See application file for complete search history.

(56) References Cited

U.S. PATENT DOCUMENTS

| | | | | |
|---|---|---|---|---|
| 1,010,975 | A * | 12/1911 | Stroner | 408/76 |
| 2,622,457 | A * | 12/1952 | Buck | 408/76 |
| 2,891,427 | A * | 6/1959 | Warsap et al. | 408/111 |
| 2,963,927 | A * | 12/1960 | Hanger | 408/79 |
| 2,964,115 | A * | 12/1960 | Clatfelter | 175/40 |
| 3,977,805 | A * | 8/1976 | Wanous | 408/115 B |
| 4,319,403 | A * | 3/1982 | Stearns | 33/638 |
| 4,594,030 | A * | 6/1986 | Weigel, Jr. | 408/10 |
| 4,818,154 | A * | 4/1989 | Bye et al. | 408/111 |
| 4,953,852 | A * | 9/1990 | Donohue | 482/87 |
| 4,999,896 | A * | 3/1991 | Mangus et al. | 29/34 B |
| 5,346,334 | A * | 9/1994 | Einaru et al. | 405/269 |
| 5,702,212 | A * | 12/1997 | Erath et al. | 408/153 |
| 6,099,213 | A * | 8/2000 | Kammeraad et al. | 408/14 |
| 6,382,889 | B1* | 5/2002 | Brown et al. | 409/175 |
| 7,083,365 | B2 | 8/2006 | Alam et al. | 408/1 |
| 7,164,474 | B2* | 1/2007 | Arntson et al. | 356/154 |

FOREIGN PATENT DOCUMENTS

| | | | | |
|---|---|---|---|---|
| CH | 666207 | A5 * | 7/1988 | |
| GB | 2103127 | A * | 2/1983 | |
| SU | 1553282 | A * | 3/1990 | |

* cited by examiner

*Primary Examiner* — Daniel W Howell
(74) *Attorney, Agent, or Firm* — Hayes Soloway P.C.

(57) ABSTRACT

A drilling apparatus contains a drilling tool and a platform. A flexible joint having three degrees of freedom connects the drilling tool to the platform. A clamping element may be provided proximate to an opening formed in the platform. The clamping element is attached to the platform and extends through an opening formed in the structure to fasten to the structure.

20 Claims, 7 Drawing Sheets

METHOD AND APPARATUS FOR SELF-ALIGNING SWIVEL FOOT POWER FEED DRILL

FIELD

The present disclosure relates to a drilling apparatus for drilling holes in structures and, in particular, to a drilling apparatus that drills holes in multi-layer structures, and that is adjustable to ensure the drilling tool is maintained in a pre-defined relationship to the area of the structure to be drilled, regardless of the shape of the surface of the structure.

BACKGROUND

The fasteners that hold together multi-layer structures, particularly those structures that are subject to significant dynamic forces and/or pressure, such as aircraft and other vehicle bodies, bridges, buildings, and others, must be properly secured in order to ensure that the structure will perform as intended over its lifetime. In order to properly secure a fastener in a multi-layer structure, the fastener hole must not have any sharp edges, i.e., burrs, the structure must be free of debris between the layers, and any sealant applied between the layers in order to make the structure air and/or water tight must be sufficiently squeezed out. When excess sealant is present between the layers, the distance between the layers is increased and/or uneven, which may be referred to as a "gasket" condition.

Thus, if burrs, debris and/or excessive sealant are present, then the layers cannot be properly fastened and the layers may suffer corrosion, cracking and/or premature fatigue failure, which generally renders the structure ineffective for its intended purpose and, therefore, subject to the expense of repair or replacement.

Thus, ensuring that a burr-less hole is drilled, that there is no debris between the layers, and that sealant is properly applied between the layers is an integral part of clamping multi-layer structures together. In the aerospace industry, for example, a significant amount of time and labor are expended to ensure that the holes through the various layers of the aircraft structure are appropriately drilled, cleaned, sealed and fastened. Initially, the layers of materials that form the structure are loosely assembled without sealant, and drill templates are aligned and attached to the structure in the areas to be drilled. A drill operator, guided by the drill template, then drills holes through the layers of materials typically using a manual drill motor.

As the hole is being drilled through the layers, the drill bit tip pushes with the full feed force applied to the drill motor. This can cause a gap to develop between a layer currently being drilled and an underlying layer, particularly when the layers are a stack-up of thin material. The gap between the layers may cause burrs about the hole and debris may gather between the layers. Thus, once the holes are drilled, the layers must be disassembled, the burrs must be removed from about the holes, and the debris must be cleaned from the surfaces of the layers, all of which is a time-consuming and labor intensive process.

Sealant is then applied to the layers prior to re-assembling the layers. In order to ensure the layers are properly sealed to provide an air and water-tight seal, a generous amount of sealant is applied to the layers. Clamps that extend through the holes must be placed through each hole of the reassembled layers in order to squeeze out the sealant to prevent excessive "gasket" between the layers before the sealant dries. The extra sealant squeezes out around the clamps and must be cleaned from the structure and the clamps during clamping and/or after the clamps are removed.

Once the sealant is cured, the clamps are removed and the holes may be countersunk. In order to countersink a hole, a countersink drill bit and microstop countersink cage are attached to the drill motor and the operator revisits each hole to drill the countersink. The holes are then inspected to ensure they were properly countersunk. The holes may be inspected by checking the countersink of each hole with a measuring tool, or by placing a fastener in the hole to check if it fits properly within the hole and countersink. If the holes are satisfactory, then fasteners may be installed and fastened with nuts or swage lock collars. Overall, this process is expensive, laborious, and time-consuming.

In addition, the integrity of the resulting holes depends upon the completion of many manual processes, which creates a risk that certain steps may be performed inadequately or completely overlooked.

For structures that have a flat outer surface, a positive, power feed drill motor with a collet mandrel is capable of drilling, reaming and countersinking holes in multi-layer structures in one step. Positive power feed drill motors with collet mandrels are commercially available. To utilize these drill motors, a hole is initially drilled through the layers of material by conventional means, such as by using a conventional drill motor to drill a hole through the layers, then de-burring the hole and cleaning the debris from between the layers.

Once the structure is reassembled, the collet is extended through the hole and secured with the mandrel on the side of the structure that is opposite the drill motor. The collet mandrel is typically attached to a platform of the drill motor such that the platform sets on the surface of the structure. The platform also generally has an opening that is aligned with the structure to be drilled, and the drilling tool of the drill motor may extend through the platform opening to drill through the structure. Thus, the collet mandrel securely holds the layers of the structure together such that holes may be drilled and countersunk within a predetermined distance from the collet mandrel in one step without the risk of debris accumulating between the layers.

Once all of the desired holes have been drilled within the predetermined distance from the collet mandrel, the collet mandrel is removed from the hole and moved to one of the holes recently drilled or a new hole must be drilled for the collet mandrel, prior to repeating the process described above to form additional holes.

Holes are preferably drilled at a predefined orientation, such as a normal orientation, relative to the surface of the structure. As long as the surface of the structure is flat, the drilling tool of the drill motor will typically be normal to the structure to be drilled because the platform lies flat on the surface and the platform is attached normal to the drilling tool. Thus, so long as the platform is normal to the drilling tool, then the surface of the structure will also be normal to the drilling tool. If, however, the surface is contoured (concave, convex, or otherwise extending in three dimensions), the drilling tool may not be normal to the area of the structure to be drilled because the platform cannot lie flat on the surface of the structure.

The drill motor with the collet mandrel described above may include an adjustable footpad to adjust the position of the platform, and therefore the drilling tool until the drilling tool is normal to the area of the structure to be drilled. The adjustable footpad is typically attached to the drill motor platform opposite the side of the platform with the opening, and is adjustable to various positions based upon the radius of curvature of the surface and the distance from the footpad to the drilling tool. This design is suitable for simple contours with only one radius of curvature between the footpad and the drilling tool, i.e., for surfaces that curve in only one dimension, because the adjustable footpad maintains contact with the contoured surface across the full width of the pad.

If, however, more than one radius of curvature is present between the foot pad and the drilling tool, such as in complexly curved surfaces exhibiting curvature in two or more dimensions, the pad cannot maintain contact with the surface across the width of the pad because the curvature of the surface may be different at one side of the foot pad than it is at the other side of the foot pad. Thus, the conventional adjustable footpad is not capable of ensuring that the drilling tool is normal or in any other predefined relationship to the surface of the structure to be drilled when the surface of the structure is complexly curved.

As such, to drill a hole in a multi-layer structure having a complex curvature, the holes must be drilled in the conventional manner of drilling, de-burring, cleaning the layers, then reassembling and sealing the layers before countersinking the holes, which is a time-consuming and labor-intensive process, as discussed above.

A modified drilling apparatus 10 that contains adjustable mechanisms that allow for the positioning of the platform to be modified is shown in FIG. 1. The adjustment mechanism shown in the embodiment of FIG. 1 has a template foot pad housing 12 and at least two adjustable members 14. The drilling apparatus 10, therefore, may be placed in a desired orientation with respect to the surface of the structure 18 by appropriately adjusting each of the adjustable members 14. For example, the drilling apparatus 10 may be oriented such that the longitudinal axis of the drilling tool 20 is normal to the point on the surface of the structure 18 to be drilled, if it is desired that the resulting drilled hole be normal to the surface. A clamping element 22 is attached to the platform 24 of the drilling apparatus 10, and extends through an existing hole in the layers of the structure 18. The drilling apparatus 10 includes a bushing 26, i.e. a template boss, that at least partially surrounds the drilling tool 20. The bushing 26 may therefore be aligned with, such as by being at least partially positioned within, another hole in the drill template in order to, therefore, align the drilling tool 20 with the area of the structure 18 to be drilled. However, this design requires regular interaction with the adjustable members 14 and manually orientating the platform 24 and drilling tool 20 to achieve a normal orientation between the drilling tool 20 and the structure 18.

SUMMARY

The present disclosure provides an apparatus and method for drilling holes in a structure. Briefly described, the drilling apparatus contains a drilling tool and a platform. A flexible joint having three degrees of freedom connects the drilling tool to the platform. The platform preferably has an opening formed therein, and a clamping element is attached to the platform adjacent the opening.

The present disclosure can also be viewed as providing methods for drilling holes in a structure. In this regard, one embodiment of such a method involves: providing a structure; applying a drilling tool and a platform to a surface of the structure, wherein the platform is attached to the drilling tool by a first flexible joint; fastening a clamping element to the structure, wherein the platform is attached to the clamping element by a second flexible joint; adjusting the drilling tool to place the drilling tool in the predefined positional relationship to the surface; and drilling a hole in the structure.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
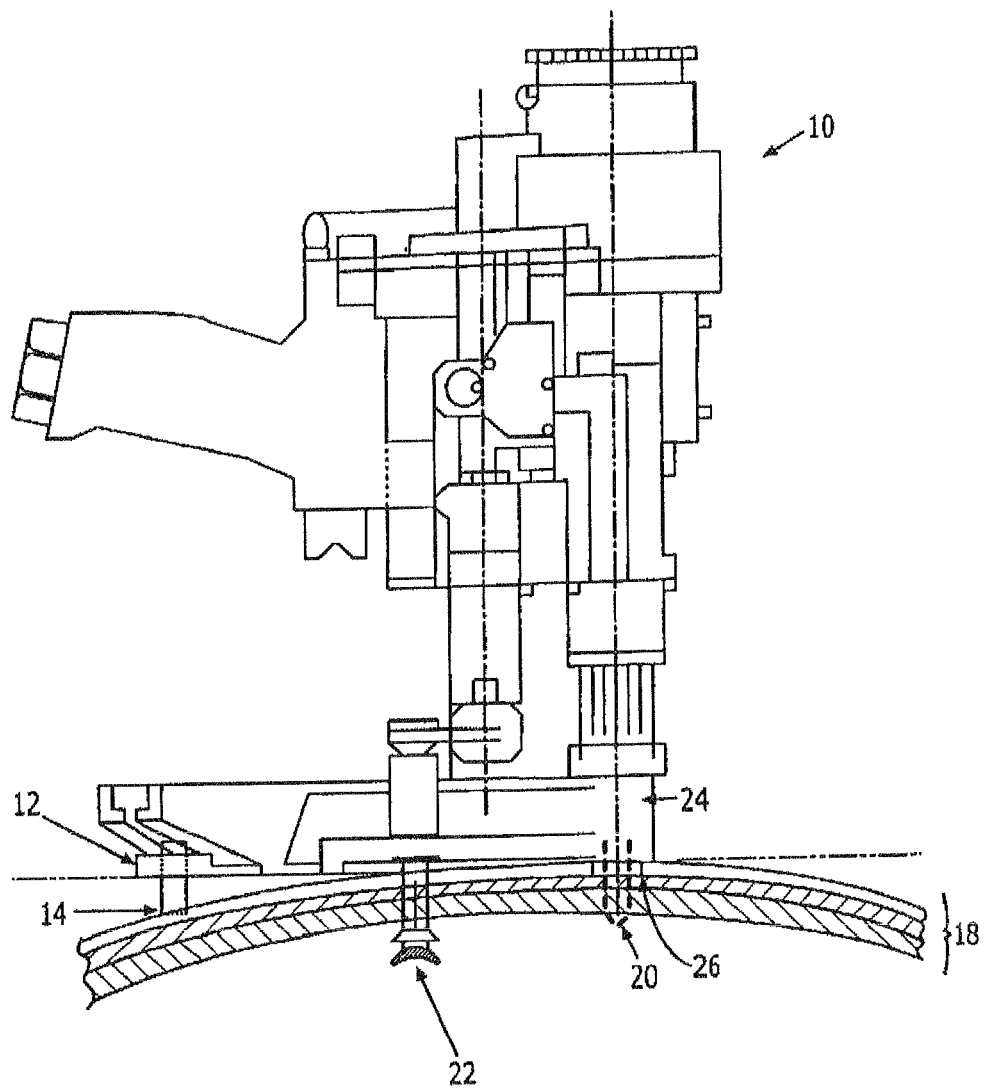
FIG. 1 is a side elevational view of a drilling apparatus, in accordance with the prior art.
Figure 2:
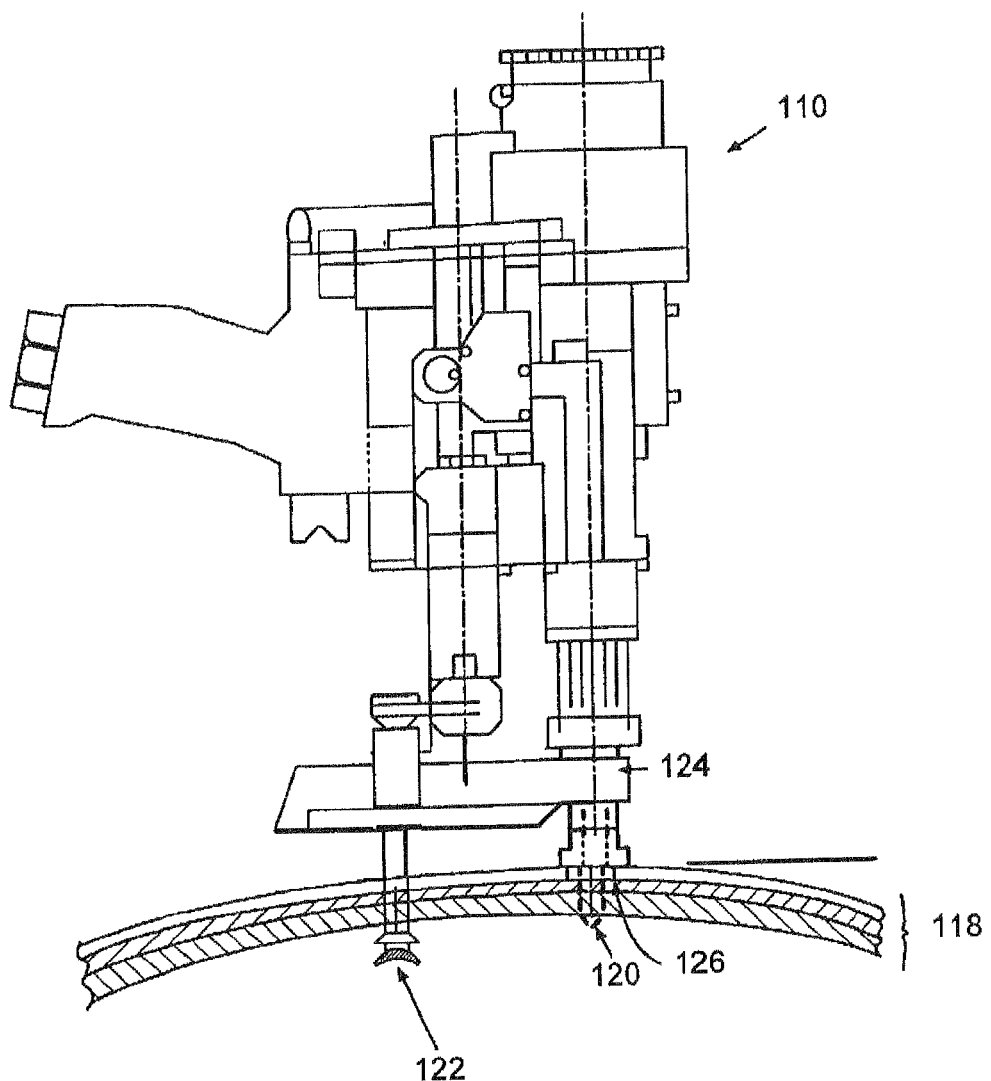
FIG. 2 is a side elevational view of a drilling apparatus, in accordance with a first exemplary embodiment of the present disclosure.
Figure 3:
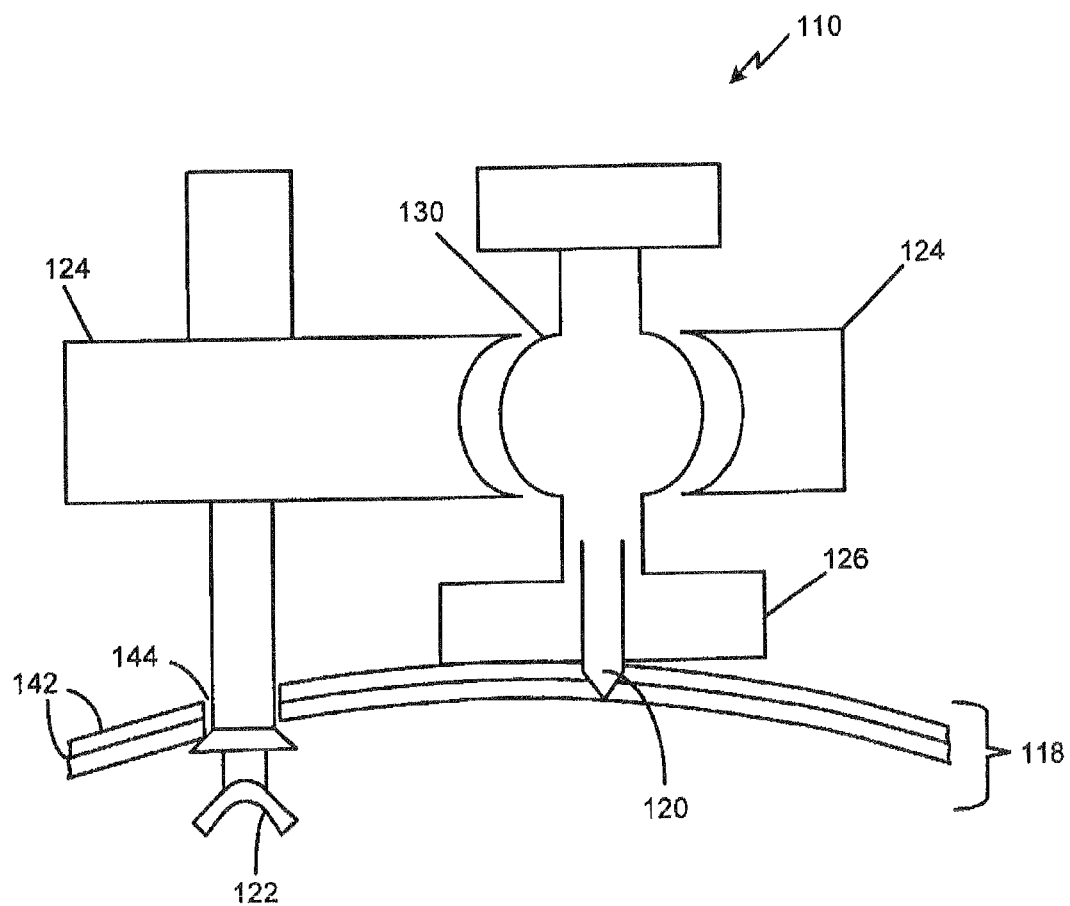
FIG. 3 is a side elevational view, in partial cross-section of a portion of the drilling apparatus shown in FIG. 2.

Referring to FIGS. 2 and 3, there is shown a drilling apparatus 110 in accordance with a first exemplary embodiment of the present disclosure. The drilling apparatus 110 contains a drilling tool 120 and a platform 124. A bushing 126 is provided proximate to a tip of the drilling tool 120, which may contribute to normalizing the drilling tool 120 to the structure 118 being worked on. A flexible joint 130 connects the drilling tool 120 to the platform 124. The flexible joint 130 allows for three degrees of freedom. The three degrees of freedom allows the platform 124 to rotate: 1) forward and back; 2) left and right; and 3) swivel, in relation to the drilling tool 120.

Figure 3A:
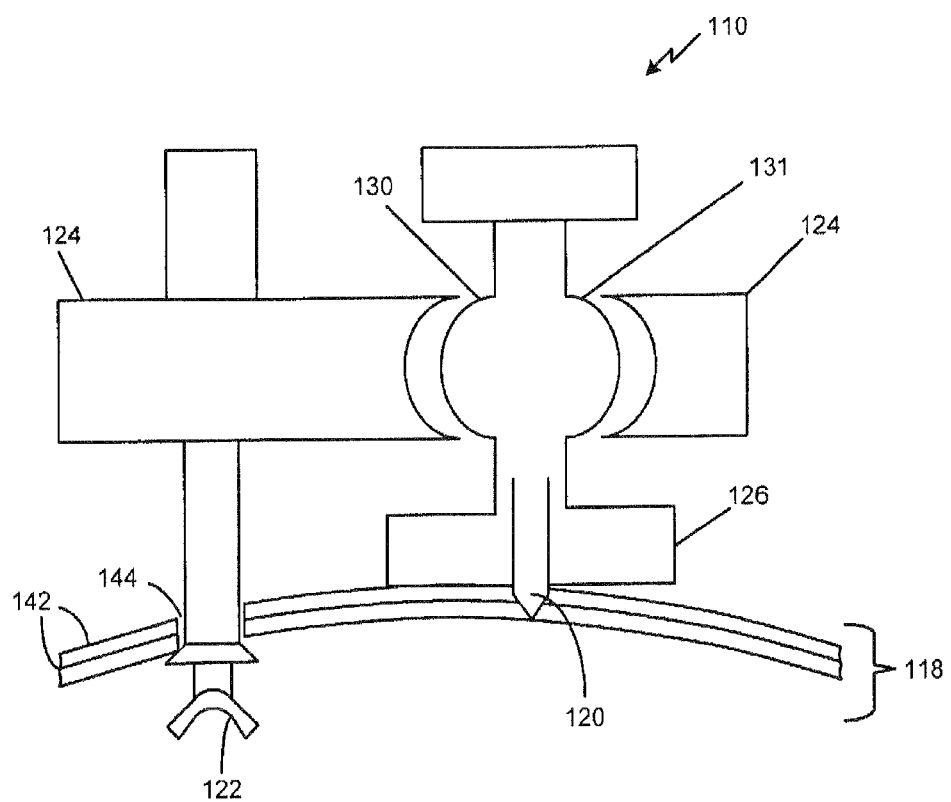

The drilling apparatus 110 may be a modified form of the drilling devices shown and described in the prior art. The flexible joint 130 allows the drilling tool 120 to be set to a normal orientation relative to the structure 118 without depending on the platform 124 for orientation. The flexible joint 130 may be, for example, a ball-and-socket joint. A ball-and-socket joint achieves the goal of providing flexible joint 130 having three degrees of freedom. As is shown in FIG. 3A, the flexible joint 130 may also be a gimbal mechanism 131, or other type of flexible joint as are known to those having ordinary skill in the art.

The structure 118 may be one or a plurality of layers 142 of material. An opening 144 may be formed through the layer or layers 142. A clamping element 122 is located proximate to an opening formed in the platform 124. The clamping element 122 may be attached to the platform 124 and extend through the layers 142 to clamp the layers 142 together and fasten to the structure 118.

Figure 4:
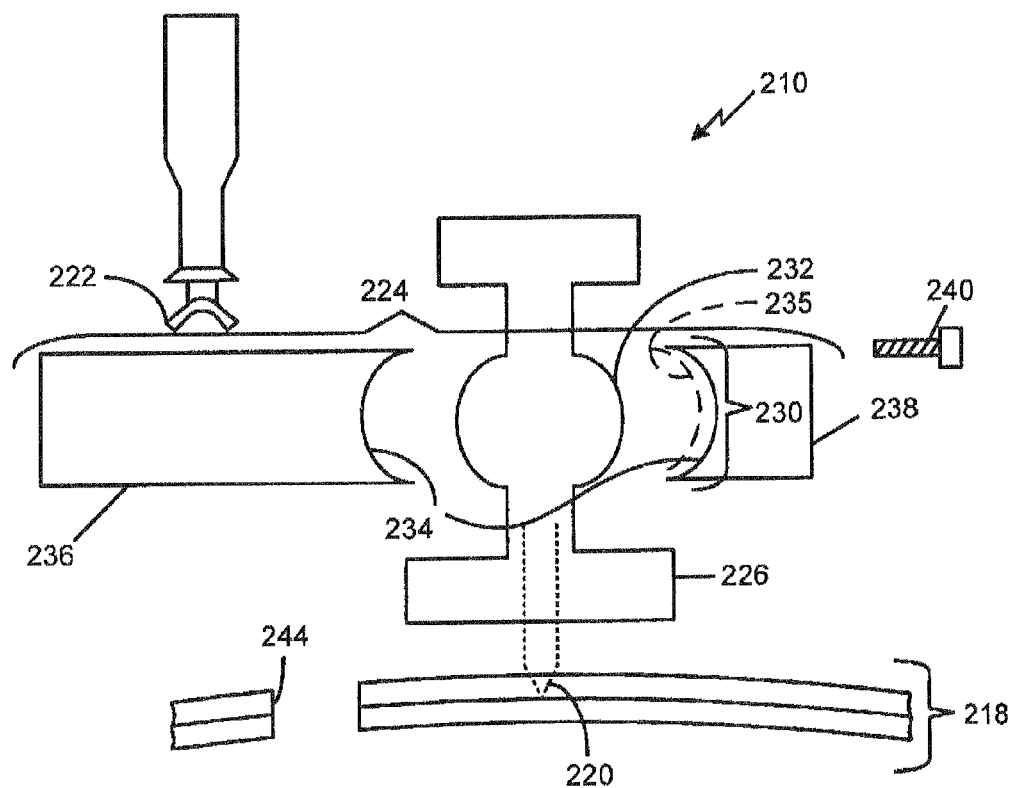
FIG. 4 is a view, similar to FIG. 3 of a portion of a drilling apparatus, in accordance with a second exemplary embodiment of the present disclosure.
Figure 5:
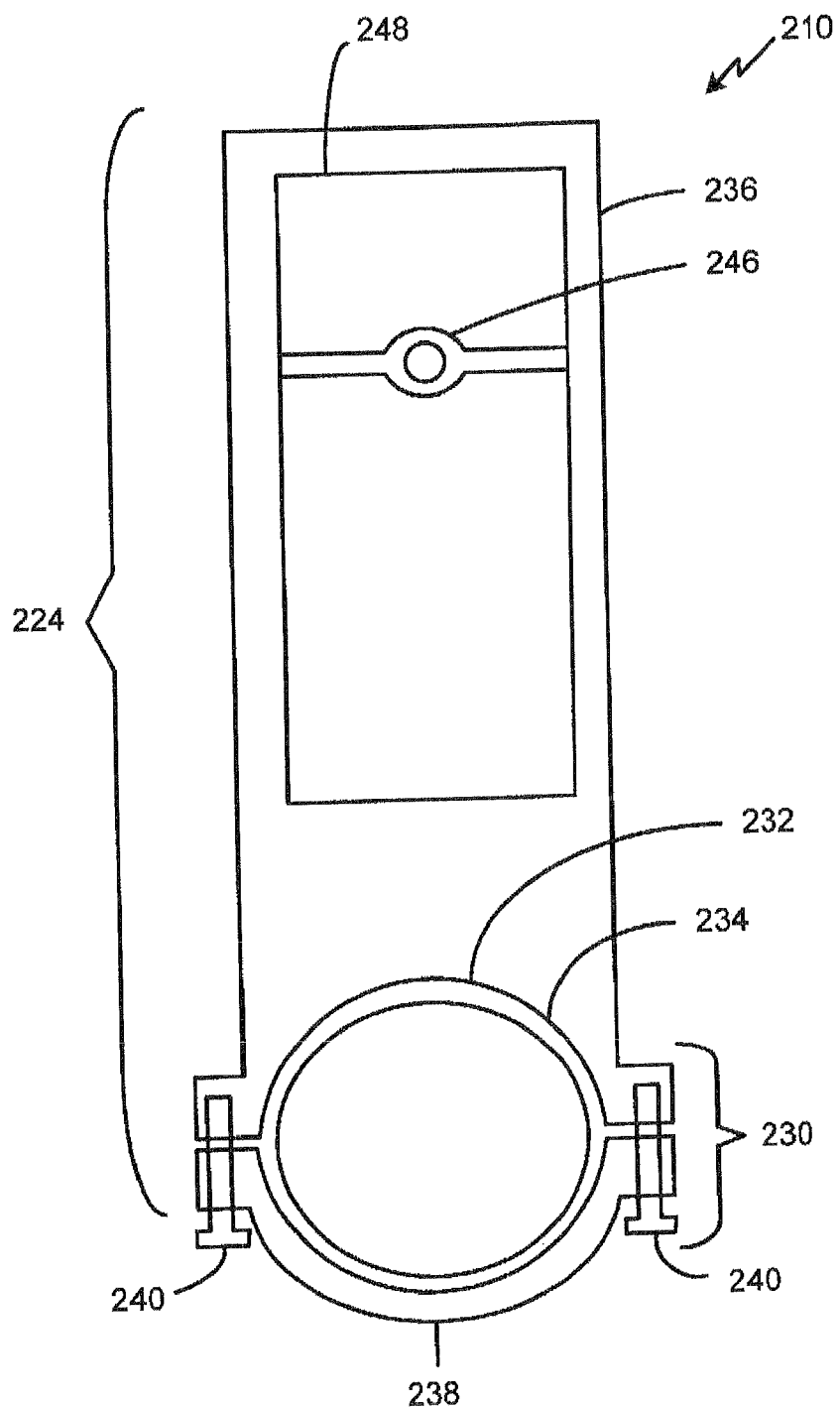
FIG. 5 is a top cross-sectional view of the portion of the drilling apparatus shown in FIG. 4.

FIGS. 4 and 5 illustrate a second exemplary embodiment of the present disclosure. As shown, the drilling apparatus 210 contains a drilling tool 220 and a platform 224. A bushing 226 is provided proximate to a tip of the drilling tool 220, which may contribute to normalizing the drilling tool 220 to the structure 218. A flexible joint 230, such as a ball-and-socket joint which allows for three degrees of freedom, connects the drilling tool 220 to the platform 224.

As shown in FIGS. 4 and 5 the platform 224 is formed with a foot 236 and a C-shaped brace 238 attached to the foot 236. The ball-and socket joint may require putting the ball 232 inside the socket 234. To that end, the foot 236 and C-shaped brace 238 are attached about the ball 232 to form the socket 234. The inner wall of socket 234 may be coated, at least partially, with a low coefficient of friction coating or loaded with a polytetrafluoroethylene ring, sold under the brand name, TEFLON®, as shown in phantom at 235. The foot 236 and C-shaped brace 238 may be attached, for instance, with a screw or other threaded fastener 240. Preferably, the friction of the ball 232 in the socket 234 is controlled by polytetrafluoroethylene ring 235 mounted along the lower ⅓ of the ball and is adjusted with shims and secured with screws around its perimeter where the two halves of the socket mate. The structure 218 may have one layer or a plurality of layers 242 of material. An opening 244 may be formed through the layer or layers 242. The clamping element 222 is located proximate to an opening 248 formed in the platform 224. The clamping element 222 may be attached to the platform 224 and extend through the layers 242 to clamp the layers 242 together and fasten to the structure 218. The clamping element 222 may be attached to the platform by a second flexible joint 246 allowing for three degrees of freedom. Providing the clamping element 222 with the second flexible joint 246 may limit the fastening of the clamping element 222 to the structure 218 from interfering with normalizing the drilling tool 220 relative to the structure 218. The second flexible joint 246 may be a gimbal mechanism. The second flexible joint 246 may be slidable along the opening 248 and may be temporarily, rigidly fixed along any portion of the opening 248. Dimensions of various elements shown in FIGS. 2-5 may be exaggerated to clearly show aspects of the disclosure discussed herein.

Figure 6:
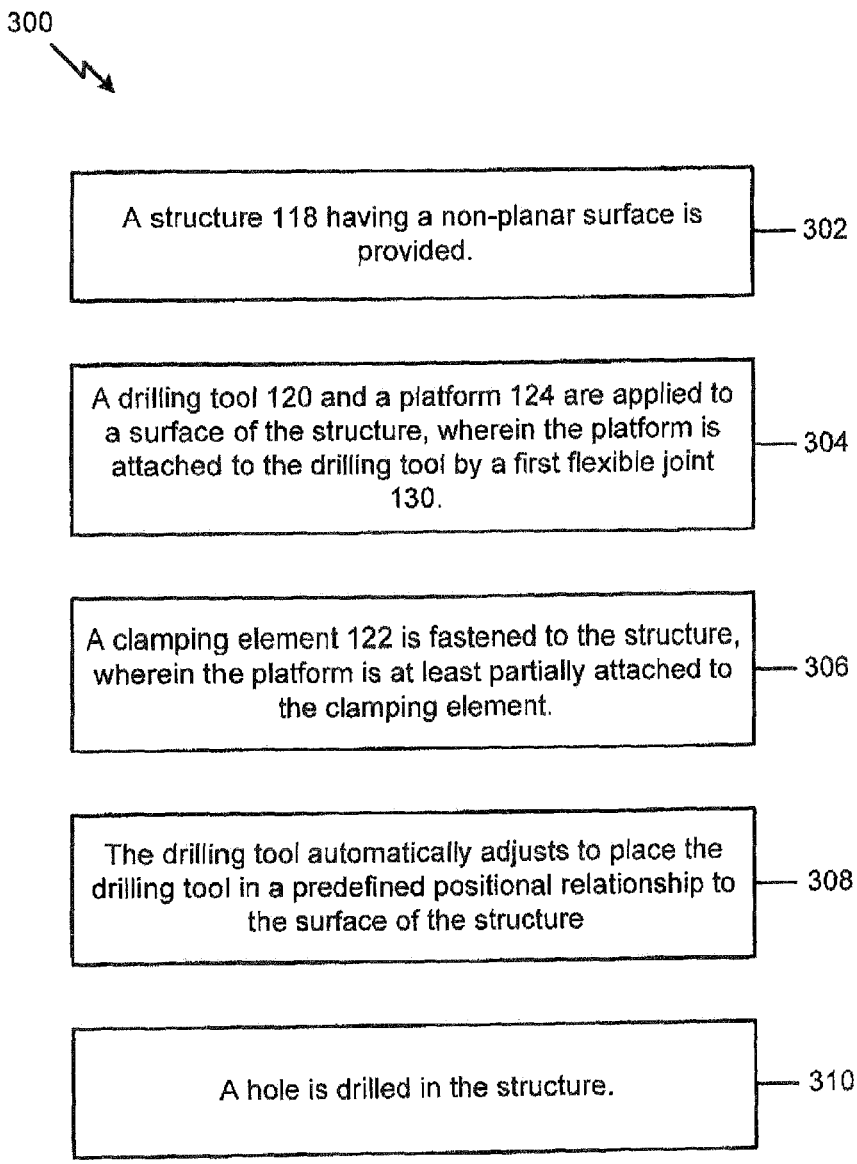
FIG. 6 is a flow chart illustrating a method of drilling holes in a structure using the drilling apparatus shown in FIG. 2.

FIG. 6 is a flow chart 300 illustrating a method of drilling holes in a structure 118 using the drilling apparatus 110 shown in FIG. 2. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved.

As is shown by block 302, a structure 118 having a non-planar surface is provided. A drilling tool 120 and a platform 124 are applied to a surface of the structure 118, wherein the platform 124 is attached to the drilling tool 120 by a first flexible joint 130 (block 304). A clamping element 122 is fastened to the structure 118, wherein the platform 124 is at least partially attached to the clamping element 122 (block 306). The drilling tool 124 automatically adjusts to place the drilling tool 124 in a predefined positional relationship to the surface of the structure 118 (block 308). A hole is drilled in the structure 118 (block 310).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A drilling apparatus for drilling holes in a structure, the drilling apparatus comprising:
    a drilling tool;
    a platform;
    a flexible joint connecting the drilling tool to the platform, wherein the flexible joint allows for three degrees of freedom;
    a normalizing bushing circumferentially positioned about at least a portion of the drilling tool, wherein the normalizing bushing contacts an exterior surface of the structure; and
    a clamping element attached to the platform and extending through an opening formed in the structure to fasten to the structure, wherein the structure is only contacted by the drilling apparatus at a first position corresponding to the clamping element and a second position corresponding to the normalizing bushing and an inward area thereof.

2. The drilling apparatus of claim 1, wherein the flexible joint is a ball-and-socket joint.

3. The drilling apparatus of claim 1, wherein the flexible joint is a gimbal mechanism.

4. The drilling apparatus of claim 1, wherein the platform further comprises a foot and a C-shaped brace attached to the foot.

5. The drilling apparatus of claim 4, further comprising a socket formed from an interior surface of the foot and C-shaped brace, wherein the socket is a portion of the flexible joint.

6. The drilling apparatus of claim 4, further comprising an adjustable tension member connecting the foot and the C-shaped brace, whereby adjusting the adjustable tensioning member impacts a flexibility of the flexible joint.

7. A drilling apparatus for drilling holes in a structure, the drilling apparatus comprising:
    a drilling tool;
    a platform; and
    a flexible joint connecting the drilling tool to the platform, wherein the flexible joint allows for three degrees of freedom, wherein the platform further comprises a foot and a C-shaped brace attached to the foot;
    further comprising an adjustable tension member connecting the foot and the C-shaped brace, whereby adjusting the adjustable tensioning member impacts a flexibility of the flexible joint, wherein the adjustable tension member is threaded.

8. The drilling apparatus of claim 1, wherein the clamping element is located proximate an opening formed in the platform.

9. The drilling apparatus of claim 1, wherein the structure further comprises a plurality of layers of material and an opening formed through the layers, and further comprising a clamping element proximate an opening formed in the platform, wherein the clamping element is attached to the platform and extends through the layers to clamp the layers together and to fasten to the structure.

10. The drilling apparatus of claim 9, wherein the clamping element is attached to the platform by a second flexible joint allowing for three degrees of freedom.

11. A method for drilling holes through a structure, the method comprising the steps of:
    providing a structure having a non-planar surface;

applying a drilling tool and a platform to a surface of the structure, wherein the platform is attached to the drilling tool by a first flexible joint and wherein a normalizing bushing is circumferentially positioned about at least a portion of the drilling tool, wherein the normalizing bushing contacts an exterior surface of the structure;

fastening a clamping element to the structure, wherein the platform is attached to the clamping element by a second flexible joint, wherein the structure is only contacted by the drilling apparatus at a first position corresponding to the clamping element and a second position corresponding to the normalizing bushing and an inward area thereof;

adjusting the drilling tool automatically to place the drilling tool in a predefined positional relationship to the surface; and drilling a hole in the structure.

12. The method of claim 11, wherein the first flexible joint is a ball-and-socket joint.

13. The method of claim 11, wherein the second flexible joint is a gimbal mechanism.

14. The method of claim 11, further comprising clamping a plurality of layers of the structure together with the clamping element.

15. The method of claim 11, wherein the step of adjusting the drilling tool automatically to place the drilling tool in the predefined positional relationship to the surface further comprises adjusting the drilling tool automatically to place the drilling tool normal to the surface.

16. A drilling apparatus for drilling holes in a structure, the drilling apparatus comprising:

a drilling tool;

a platform having an opening formed therein;

a ball-and-socket joint connecting the drilling tool to the platform, wherein the ball-and-socket joint allows for three degrees of freedom;

a normalizing bushing circumferentially positioned about at least a portion of the drilling tool, wherein the normalizing bushing contacts an exterior surface of the structure; and a clamping element attached to the platform at the opening and extending through an opening formed in the structure to fasten to the structure, wherein the structure is only contacted by the drilling apparatus at a first position corresponding to the clamping element and a second position corresponding to the normalizing bushing and an inward area thereof.

17. The drilling apparatus of claim 16, wherein a socket of the ball-and-socket joint further comprises a polytetrafluoroethylene ring.

18. The drilling apparatus of claim 16, wherein the platform further comprises a foot and a C-shaped brace attached to the foot.

19. The drilling apparatus of claim 18, further comprising a socket formed from an interior surface of the foot and C-shaped brace, wherein the socket is a portion of the flexible joint.

20. The drilling apparatus of claim 19, further comprising an adjustable tension member connecting the foot and the C-shaped brace, whereby adjusting the adjustable tensioning member impacts a flexibility of the flexible joint.

* * * * *